GRAIN BOUNDARY TRANSISTOR ANALOG MEMORY DEVICE

Filed May 19, 1965 2 Sheets-Sheet 1

GRAIN BOUNDARY SEMICONDUCTOR
(EQUIVALENT CIRCUIT)

INVENTOR
WALLACE W. LINDEMANN

BY Cushman, Darby & Cushman
ATTORNEYS

April 9, 1968 W. W. LINDEMANN 3,377,580

GRAIN BOUNDARY TRANSISTOR ANALOG MEMORY DEVICE

Filed May 19, 1965 2 Sheets-Sheet 2

INVENTOR
WALLACE W. LINDEMANN

BY Cushman, Darby & Cushman
ATTORNEYS

United States Patent Office
3,377,580
Patented Apr. 9, 1968

3,377,580
GRAIN BOUNDARY TRANSISTOR ANALOG MEMORY DEVICE

Wallace W. Lindemann, Minneapolis, Minn., assignor to Control Data Corporation, Minneapolis, Minn., a corporation of Minnesota Filed May 19, 1965, Ser. No. 456,930
7 Claims. (Cl. 340—173)

ABSTRACT OF THE DISCLOSURE

An analog memory device using the variable capacitance of a grain boundary semiconductor at low temperatures. An analog information source is connected to control the variable capacitance of the grain boundary semiconductor. The variable capacitance in turn determines the passage of a signal from a signal source connected to one point on the semiconductor to a sensing means joined to another point thereon. The amount of signal sensed is indicative of the analog signal provided by the analog information source. Low temperatures are necessary to develop adequate storage time for the grain boundary semiconductor capacitance.

The present invention generally relates to analog memory devices and, more particularly, to analog memory devices which utilize the capacitance associated with the grain boundaries of semiconductor materials.

Recent work in the processing of large numbers of simultaneous inputs to a system has spurred interest in adaptive nerve nets. By an adaptive nerve net is meant a system which will adapt itself to its surroundings. The human eye is an example of such a system in that it adapts its inner structure in accordance with the environment in which it finds itself in order to operate more efficiently. In the attempt to build mechanical simulators of such biological systems as the eye, it has been found that the basic element of the mechanical simulator, the neuron, must be an inexpensive analog or quasi-digital storage device. See George Nagy, "A Survey of Analog Memory Devices," IEEE Transactions on Electronic Computers, August 1963, p. 388, for a summary of devices proposed as analog memory elements.

Another device that has been considered is a resistor whose resistance can be varied by changing the thickness of a plated resistive film. However, this system is slow and it does not lend itself to miniaturization.

The use of multi-aperture cores has also been proposed and while they are not slow, they also are not easily miniaturized.

This invention overcomes the shortcomings of prior arrangements by providing a rapidly responsive analog memory device, using grain boundary semiconductor elements, which may be used as the basic element in an adaptive nerve net.

Another object of my invention is to provide an analog memory device which is economical to make and which readily lends itself to micro-miniaturization.

A further object of my invention is to provide a device employing grain boundary semiconductor elements, which when properly cooled, may be used as an economical, easily miniaturized analog memory device.

Further objects and the entire scope of the invention will become more fully apparent when considered in light of the following detailed description of illustrative embodiments of this invention and from the appended claims.

The illustrative embodiments may be best understood by reference to the accompanying drawings, wherein.

Figure 1:
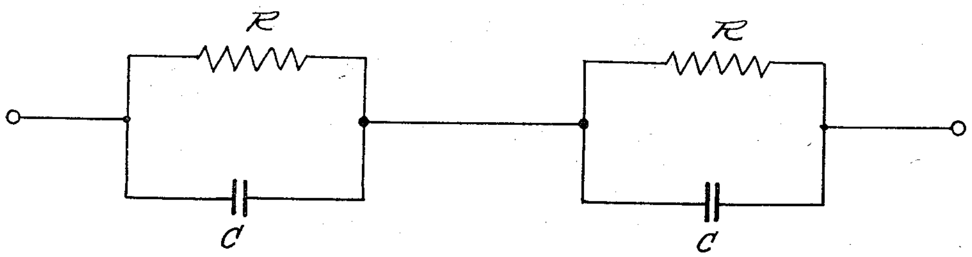
FIGURE 1 is a schematic diagram of the equivalent circuit of the grain boundary of a grain boundary semiconductor element.
Figure 3:
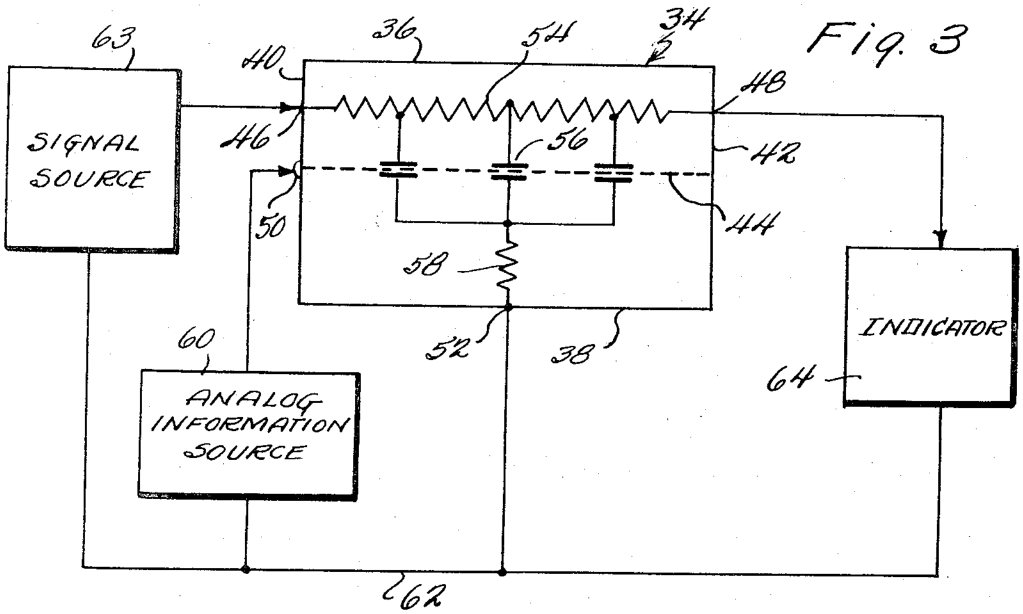
Figure 4:
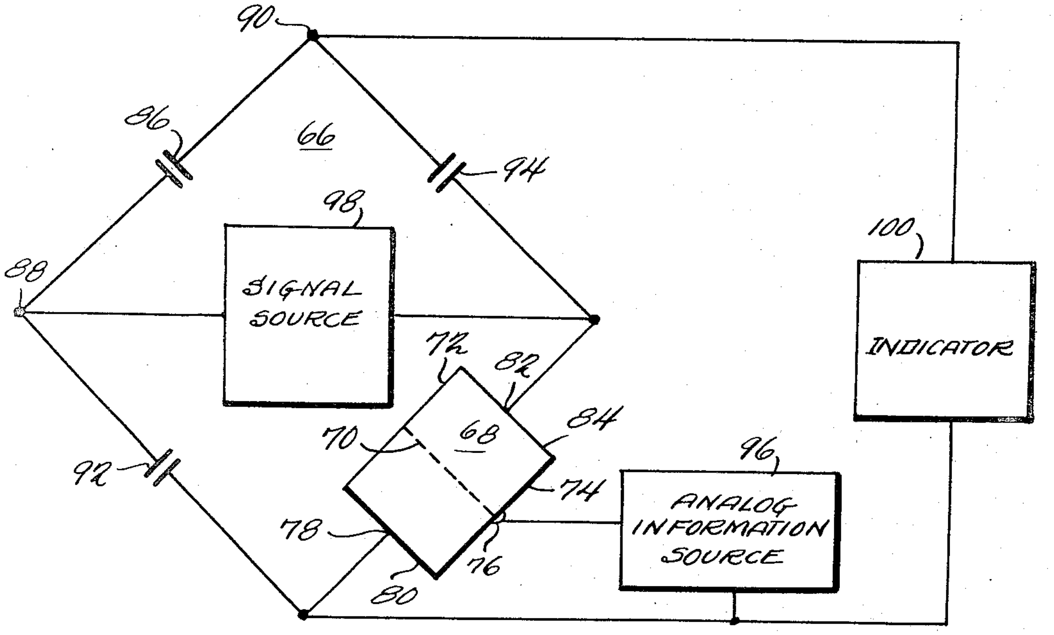

FIGURE 3 is an illustration of a specific embodiment adaptable to the general arrangement of FIGURE 1, the semiconductor being illustrated schematically as the frequency determining element in a distributed bridge-T filter; and FIGURE 4 is an illustration of another embodiment adaptable to the general arrangement of FIGURE 1, the semiconductor element being illustrated as a portion of a capacitor bridge.

Before the details of my invention are disclosed, a general discussion of grain boundary semiconductors will be presented.

Grain boundary semiconductors are well known devices. See "Grain Boundary Barriers in Germanium," Phys. Rev., vol. 88, No. 4, Nov. 15, 1952, pp. 867–875 and "Theory of Dislocations in Germanium," Philosophical Magazine, vol. 45, No. 367, August, 1954, pp. 775–796. The grain boundary in semiconductor materials is not due to an insulating layer of foreign material. Instead, the boundaries are introduced either by controlled plastic deformations of the material at high temperatures or by the formation of separate crystals joined together in their crystallization from a semiconductor melt. Because of the formation of the boundary, there are some atoms at the edge of the boundary, which do not have a neighbor on the other side of the boundary. These atoms have a dangling unpaired electron. It is this dangling unpaired electron which gives rise to the electrical effects of grain boundary semiconductors.

The dangling unpaired electrons act as acceptor sites which trap conduction electrons in n-type material and thereby attain a net negative charge. This negative charge tends to repel conduction electrons on either side of the boundary and the result is an electron depleted region, which has an effective capacitance. The capacitance is dependent upon the width of the depletion region and therefore on the net amount of charge of the boundary.

The grain boundary charge can be increased by the application of a negative voltage directly to the boundary through an alloyed contact. It can be decreased by reducing the applied voltage, shorting the boundary to the bulk, or by exposing the boundary to an electromagnetic wave having a frequency which depends upon the band gap of the semiconducting material in question.

The equivalent circuit of the boundary comprises two parallel RC circuits in series with one another. This equivalent circuit is illustrated in FIGURE 1. The time constant of the equivalent circuit is very short at room temperatures, but as the boundary is cooled to liquid nitrogen temperature (−196° C.), the time constant is of the order of days. At even lower temperatures, (liquid helium (−267° C.), for instance), the time constant is considerably longer. This is due to the fact that the resistors of the RC circuits are sensitive to temperature changes, whereas the capacitances are most sensitive to boundary change. This means that the gain boundary when cooled can provide effective analog storage, a function which is the heart of an adaptive nerve or neuron.

In accordance with the principles of my invention, I provide a grain boundary semiconductor element which is cooled to at least −196° C. (the temperature of liquid nitrogen). An alloyed p-type contact is made with the grain boundary in n-type germanium for instance. (This contact is ohmic to the grain boundary and rectifying to the bulk material.) Connected to this p-type contact is a source of negative voltage. By charging the boundary with electrons through this p-type contact from the negative voltage source, the effective capacitance of the boundary is varied. The value of this effective capacitance corresponds to the amount of information stored by the grain boundary. Ohmic contacts are made to the bulk material at positions remote from the grain boundary to take advantage of the variable effective capacitance of the grain boundary. The variety of ways in which these ohmic contacts can be made to the bulk material will be illustrated in the several specific embodiments of this invention hereinafter described in detail. To one of the ohmic contacts is connected a source of voltage which provides the signal to be used in determining the size of the effective capacitance corresponding to the grain boundary; while connected to another ohmic contact is a sensing means to determine the amount of information that the grain boundary contains.

Now that my invention has been briefly described, the details thereof will be set forth with reference to FIGURES 2–4.

Figure 2:
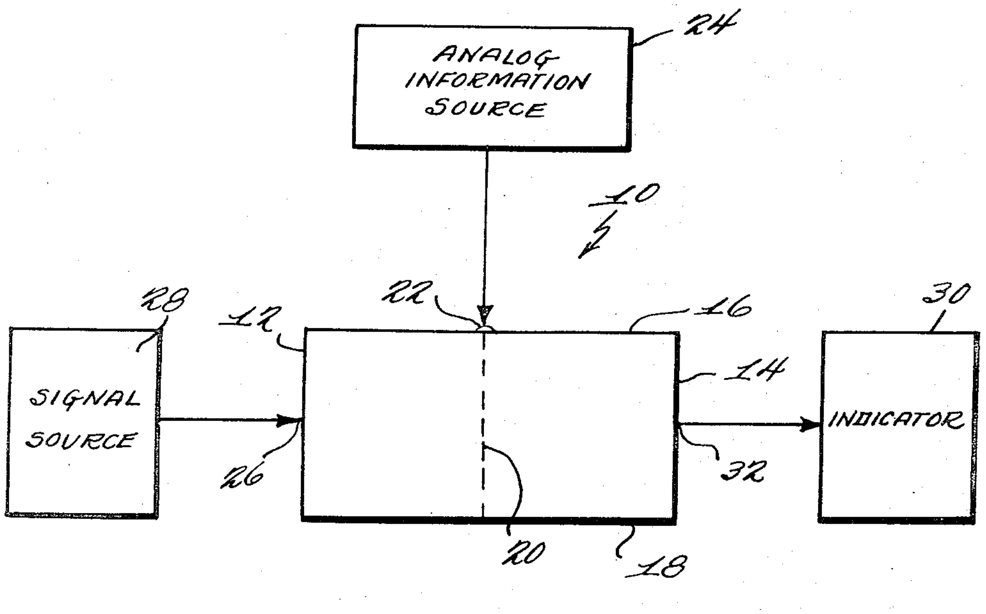
FIGURE 2 is a block diagram generally illustrating an arrangement for utilizing the variable effective capacitance of a grain boundary semiconductor element as an analog memory device.

FIGURE 2 shows in block diagram form the manner in which the grain boundary semiconductor element is used as an analog memory element or adaptive neuron. The semiconductor element is made of n-type germanium. For the purposes of this discussion, only n-type germanium will be considered, although it will be appreciated that the same basic principles apply to other types of semiconductors.

In order that the capacitive element of the equivalent impedance may be effectively utilized, it is necessary to cool the semiconductor element 10 to at least −196° C. (the temperature of liquid nitrogen). This increases the value of the two parallel resistances of the equivalent circuit of FIGURE 1 and enables the grain boundary to retain the amount of information stored in it for a long period of time—in the order of days. This is the crucial factor in insuring that the grain boundary semiconductor element will perform effectively as an adaptive neuron or analog memory element. An additional advantage of the use of this element in an adaptive network is the fact that it can be effectively miniaturized.

Semiconductor 10 has terminating faces which are two ends 12 and 14 and at least two sides 16 and 18. The shape of the element is not critical. The grain boundary 20 is shown extending from side 16 to side 18. It is not critical whether this boundary extends from side to side or from end to end. The critical thing is to effectively utilize the variable effective capacitance corresponding to the grain boundary 20.

An alloyed p-type contact or connection 22 is made with the grain boundary. This contact is ohmic to the grain boundary and rectifying to the bulk material. An analog information source 24 is connected to contact 22. The analog information or voltage source 24 regulates the size of the variable effective capacitance associated with the grain boundary 20 and thereby controls the amount of information stored by the boundary.

Joined to the bulk of the n-type material at connection or contact 26 is a signal source 28, which provides the voltage signal for determining the amount of information stored in the grain boundary 20. The connection 26 is ohmic. The signal source 28 may be any voltage source which causes energy to be transferred through the grain boundary semiconductor element 10. The amount of energy that is able to get through the element 10 is determined by the size of the variable effective capacitance associated with the grain boundary 20. The connection 26 must be physically remote from the grain boundary.

Sensing means in the form of an indicator 30 is also connected to the bulk of the n-type material via ohmic contact 32. The indicator gives an output indicative of the amount of information contained at the grain boundary by sensing the amount of energy which the variable effective capacitance of the grain boundary 20 permits to be passed from the signal source 28.

FIGURE 3 shows one specific embodiment of my invention wherein the grain boundary of the semiconductor element acts as the frequency determining element of a bridge-T filter generally indicated at 34. The semiconductor element has at least two sides 36 and 38 and two ends 40 and 42. The grain boundary 44 extends from end 40 to end 42. An ohmic connection or contact 46 is made on the bulk of the n-type material, at a point physically remote from the grain boundary. Another ohmic connection or contact 48 is made on the bulk of the n-type material at a point which is also physically remote from the grain boundary and which lies on the same side of the grain boundary as connection 46. An alloyed p-type contact or connection 50 is made to the grain boundary, the contact with the boundary being ohmic and the contact with the bulk being rectifying. An ohmic contact or connection 52 is made to the bulk of the n-type material on the other side of the grain boundary with respect to connections 46 and 48.

An effective distributed resistance 54 extends from connection 46 to connection 48, an effective capacitance 56 extends along the grain boundary, and an effective resistance 58 extends from the grain boundary to connection 52, thereby resulting in a distributed bridge-T filter, this filter being adaptable to integration into a single chip of semiconductor material.

Information is stored within the grain boundary from an analog information source 60 which is connected between contact 50 and common reference line 62. The filter is driven by a signal source 63 which is connected between ohmic connection 46 and common reference line 62. Stored information is displayed on an indicator 64 which is connected between contact 48 and common reference 62. This embodiment operates in the manner described with reference to FIGURE 2. More particularly, the amount of information stored controls the passage of signals from source 63 to the indicator 64.

FIGURE 4 shows a capacitive bridge network, generally indicated at 66, utilizing semiconductor element 68 as one of its capacitances. Semiconductor element 68 has a grain boundary 70 extending from side 72 to side 74. An alloyed contact or connection 76 is made with the grain boundary 70, an ohmic contact being made with the grain boundary and a rectifying contact being made with the bulk. An ohmic connection 78 is made with the bulk of the n-type material at end 80. Ohmic connection 82 is made with the bulk of the n-type material at end 84.

To complete the bridge, capacitor 86 is connected between bridge terminals 88 and 90, and capacitor 92 is connected between terminal 88 and ohmic connection 78. Capacitor 94 is connected between bridge terminal 90 and ohmic connection 82. Capacitors 86, 92 and 94 and semiconductor element 68 together comprise the capacitive bridge which is used as an adaptive nerve cell or neuron.

Analog information is stored in the grain boundary 70 from analog information source 96 which is connected between connection 76 and 78. Signal source 98 is connected between bridge terminal 88 and ohmic connection 82. Indicator 100 is joined between bridge terminal 90 and connection 78. Again in this embodiment the grain boundary capacity is used to vary the coupling between the signal source 98 and the indicator means 100. Therefore, the amount of information passed by the neuron varies in accordance with the amount of information stored in the grain boundary by analog information source 96.

Although the invention has been described with respect to a preferred embodiment, which requires that the boundary be cooled to the temperature of liquid nitrogen (−196° C.), it is possible to operate the device at the temperature of Dry Ice (−77° C.). At this temperature the storage time is about two or three minutes, which is satisfactory for some applications.

Thus, there has been described preferred embodiments of the invention which provide all of the foregoing objects and advantages. However, it will be apparent to those of ordinary skill in the art, after reading this disclosure, that certain modifications may be made within the spirit of the invention, and it is to be understood that there is no intention to limit this invention to the exemplary apparatus described since the scope of this invention is determined by the following claims.

What is claimed is:

1. An analog memory device comprising: a semiconductor element having a grain boundary therein and cooled to a temperature of at least −77° C.; an analog voltage source connected to said element at the grain boundary to vary the effective capacitance of said boundary as a function of the magnitude of the voltage of said source; and sensing means connected to said element remote from the grain boundary, and simultaneously operable with variation of the effective capacitance of the grain boundary by the analog voltage source, for determining the variable effective capacitance of said boundary.

2. An analog memory device as set forth in claim 1 wherein said sensing means includes an additional voltage source connected to said element at a first location remote from said grain boundary to supply energy to said element, and detecting means joined to said semiconductor element at a second location remote from said grain boundary for detecting the energy from said additional source passing through said element, said detected energy being a function of the variable effective capacitance of the boundary.

3. An analog memory device comprising: a semiconductor element having a grain boundary therein and cooled to a temperature of at least −77° C.; a first connection in ohmic contact with said grain boundary and in rectifying contact with the semiconductor material adjacent said boundary; a second connection, physically remote from said grain boundary, in ohmic contact with the semiconductor element; a third connection, physically remote from said grain boundary and said second connection, in ohmic contact with said semiconductor element; means electrically joined with said first connection for applying information to said element to vary the effective capacitance of said boundary for storage of the information at the grain boundary; and means electrically joined to said second and third connections for sensing the information stored at said grain boundary.

4. An analog memory device as set forth in claim 3, wherein said semiconductor element is an n-type material and said means for applying information for storage at the grain boundary is a negative source of voltage.

5. An analog memory device as set forth in claim 3, wherein said means for applying information for storage at the grain boundary is a first source of voltage; and wherein said sensing means includes an additional voltage source joined to said second connection for supplying energy to said element, and detecting means joined to said third connection for detecting the energy from said additional voltage source passing through said element, said detected energy being a function of the information stored at the grain boundary.

6. A device for storing analog information comprising:

a semiconductor element having a grain boundary therein and cooled to a temperature of at least −77° C.;

a first connection in ohmic contact with said grain boundary and in rectifying contact with the semiconductor material adjacent said boundary;

a second connection, physically remote from said grain boundary on one side thereof, in ohmic contact with the semiconductor element;

a third connection, physically remote from said grain boundary and said second connection and on the same side of the boundary as said second connection, in ohmic contact with the semiconductor element;

a fourth connection, physically remote from said grain boundary and on the opposite side thereof with respect to said second and third connections, in ohmic contact with the semiconductor element;

a first voltage source electrically joined between said first and fourth connections for applying information to said element to vary the effective capacitance of said boundary for storage of the information at the grain boundary;

an additional voltage source electrically joined between said second and fourth connections for supplying energy to said element; and detecting means electrically joined between said third and fourth connections for detecting the energy from said additional voltage source passing through said semiconductor element, said detected energy being a function of the information stored at the grain boundary.

7. A device for storing analog information comprising:

a semiconductor element having a grain boundary therein and cooled to a temperature of at least −196° C.;

a first connection in ohmic contact with said grain boundary and in rectifying contact with the semiconductor material adjacent said boundary;

a second connection, physically remote from said grain boundary, in ohmic contact with the semiconductor element;

a third connection, physically remote from said grain boundary and said second connection, in ohmic contact with the semiconductor element;

first, second and third capacitors joined in series between said second and third connections;

a first voltage source electrically joined between said first and second connections for applying information to said element to vary the effective capacitance of said boundary for storage of the information at the grain boundary;

an additional voltage source electrically joined between the third connection and the junction point between said first and second capacitors for supplying energy to said element; and detecting means electrically joined between the second connection and the junction point between said second and third capacitors for detecting the energy from said additional voltage source passing through said semiconductor element, said detected energy being a function of the information stored at the grain boundary.

References Cited

UNITED STATES PATENTS

| | | | |
|---|---|---|---|
| 3,021,433 | 2/1962 | Morrison | 317—235 X |
| 3,029,353 | 4/1962 | Gold et al. | 307—88.5 |
| 3,109,163 | 10/1963 | Mueller | 340—173 |

OTHER REFERENCES

L. J. Giacoletto: "Three-Terminal Variable Capacitance Semiconductor Device," Proc. IRE, pp. 510–511, February 1961.

BERNARD KONICK, *Primary Examiner.*

J. F. BREIMAYER, *Assistant Examiner.*